United States Patent
Mukai (10) Patent No.: US 12,068,124 B2
(45) Date of Patent: Aug. 20, 2024

(54) PROTECTION ELEMENT AND PROTECTION CIRCUIT

(71) Applicant: DEXERIALS CORPORATION, Tochigi (JP)

(72) Inventor: Koichi Mukai, Shimotsuke (JP)

(73) Assignee: DEXERIALS CORPORATION, Tochigi (JP)

(*) Notice: Subject to any disclaimer, the term of this patent is extended or adjusted under 35 U.S.C. 154(b) by 0 days.

(21) Appl. No.: 17/628,535

(22) PCT Filed: Jul. 20, 2020

(86) PCT No.: PCT/JP2020/027996
§ 371 (c)(1),
(2) Date: Jan. 19, 2022

(87) PCT Pub. No.: WO2021/015154
PCT Pub. Date: Jan. 28, 2021

(65) Prior Publication Data
US 2022/0262586 A1 Aug. 18, 2022

(30) Foreign Application Priority Data
Jul. 22, 2019 (JP) ................................. 2019-134872

(51) Int. Cl.
*H01H 37/76* (2006.01)
*H01H 85/02* (2006.01)
*H01H 85/50* (2006.01)

(52) U.S. Cl.
CPC ............ *H01H 37/76* (2013.01); *H01H 85/02* (2013.01); *H01H 85/50* (2013.01)

(58) Field of Classification Search
CPC ...... H01H 37/76; H01H 85/046; H01H 85/06; H01H 85/02; H01H 85/0052; H01H 85/50; H01H 2085/0275; H02J 7/00304
(Continued)

(56) References Cited

U.S. PATENT DOCUMENTS

| 2003/0064257 A1 | 4/2003 | Iwasaki et al. | |
| 2005/0221164 A1* | 10/2005 | Kawazu | H01M 10/42 429/61 |
| 2011/0211284 A1* | 9/2011 | Yoneda | H01H 85/36 29/622 |

FOREIGN PATENT DOCUMENTS

| CN | 102237674 | 11/2011 |
| CN | 102263396 | 11/2011 |

(Continued)

OTHER PUBLICATIONS

Machine Translation of Yoneda Japanese Patent Document JP 2017-174590 A Sep. 28, 2017 (Year: 2017).*

(Continued)

*Primary Examiner* — Kevin J Comber
(74) *Attorney, Agent, or Firm* — Schwegman Lundberg & Woessner, P.A.

(57) ABSTRACT

A protection element (10) of the present invention has a substrate (11), a first fuse element (12) and a second fuse element (13) connected in series on the substrate (11), a heater (14) connected between the first fuse element (12) and the second fuse element (13), a third upper electrode part (17) connected between the first fuse element (12) and the second fuse element (13) and connected to the heater (14) in series, a first conduction part (18) connected to the third upper electrode part (17) and having a lower resistance value than the heater (14), and a third lower electrode part (19) connected to the first conduction part (18) and configured to be connectable to an external protection circuit.

6 Claims, 10 Drawing Sheets

(58) Field of Classification Search
USPC .......................................................... 361/104
See application file for complete search history.

(56) References Cited

FOREIGN PATENT DOCUMENTS

| | | | | |
|---|---|---|---|---|
| CN | 104919670 | | 9/2015 | |
| CN | 107615440 | | 1/2018 | |
| CN | 109937464 | | 6/2019 | |
| JP | 4095426 | B2 | 3/2008 | |
| JP | 2015201313 | A | 11/2015 | |
| JP | 2016031863 | A | 3/2016 | |
| JP | 2017117774 | A | 6/2017 | |
| JP | 2017174590 | A | 9/2017 | |
| JP | 2017174590 | A * | 9/2017 | ............ H01H 37/76 |
| JP | 2017228379 | | 12/2017 | |
| JP | 2018018623 | | 2/2018 | |
| JP | 2019029244 | | 2/2019 | |
| JP | 6707377 | B2 | 5/2020 | |
| JP | 6707377 | | 6/2020 | |
| JP | 6797565 | B2 | 11/2020 | |
| JP | 6797565 | | 12/2020 | |
| JP | 6811590 | | 12/2020 | |
| TW | 201816824 | | 5/2018 | |
| WO | 2015156019 | | 10/2015 | |
| WO | 2017163765 | | 9/2017 | |

OTHER PUBLICATIONS

Machine translation of Yoneda Japanese Patent Document JP 2017-174590 A Sep. 2017 (Year: 2017).*

"International Application Serial No. PCT/JP2020/027996, International Search Report dated Sep. 29, 2020", w/ English Translation, (Sep. 29, 2020), 5 pgs.

"International Application Serial No. PCT/JP2020/027996, Written Opinion dated Sep. 29, 2020", (Sep. 29, 2020), 5 pgs.

"Japanese Application No. 2019-134872, Notice of Reasons for Rejection mailed Feb. 7, 2023", (Feb. 7, 2023), 12 pgs.

"Japanese Application No. 2019-134872, Submission for publications dated Dec. 13, 2022", (Dec. 13, 2022), 11 pgs.

"European Application Serial No. 20844115.4, European Search Report dated Jul. 3, 2023", (Jul. 3, 2023), 7 pgs.

"Chinese Application Serial No. 202080050697.7, Office Action dated Dec. 4, 2023", w English Translation, (Dec. 4, 2023), 15 pgs.

"Taiwanese Application Serial No. 109124775, Office Action dated Dec. 7, 2023", w English Translation, (Dec. 7, 2023), 12 pgs.

"Japanese Application Serial No. 2019-134872, Opposition dated May 2, 2024", w English Translation, (May 2, 2024), 34 pgs.

"Japanese Application Serial No. 2019-134872, Written Amendment dated May 2, 2024", w English Translation, (May 2, 2024), 14 pgs.

* cited by examiner

PROTECTION ELEMENT AND PROTECTION CIRCUIT

PRIORITY APPLICATIONS

This application is a U.S. National Stage Filing under 35 U.S.C. § 371 from International Application No. PCT/JP2020/027996, filed on Jul. 20, 2020, and published as WO2021/015154 on Jan. 28, 2021, which claims the benefit of priority to Japanese Application No. 2019-134872, filed on Jul. 22, 2019; the benefit of priority of each of which is hereby claimed herein, and which applications and publication are hereby incorporated herein by reference in their entireties.

TECHNICAL FIELD

The present invention relates to a protection element and a protection circuit and relates to, for example, a protection element and a protection circuit that are connected between a secondary battery and a charger in a charge and discharge circuit of a secondary battery.

BACKGROUND ART

Conventionally, protection circuits have been mounted in a variety of mobile devices equipped with a secondary battery, such as mobile phones or portable computers. An example of a conventional protection circuit is a secondary battery device having a power storage device, a plurality of protection circuits, and first and second output terminals, in which the protection circuits each have two fuse elements connected in series, when an external circuit is connected to the first and second output terminals, a discharge current that is supplied from the power storage device to the external circuit and a charge current that is supplied from the external circuit to the power storage device flow through the two fuse elements connected in series in the plurality of protection circuits (Patent Document 1).

This secondary battery device has heaters connected to connection points between the fuse elements at one end, one end of a rectifying element is connected to the other end of each heater, a switch element is connected to the other end of each of the rectifying elements, and, when the switch elements become conductive, a current flows through the switch element and each rectifying element to the heater of each protection circuit. In addition, in this secondary battery device, at least two rectifying elements are inserted in the middle of a current path connecting the terminals of the heaters of the protection circuits, and, even when a voltage difference is caused between the terminals of the heaters of two protection circuits in a state in which a short-circuit current flows and one of the fuse elements is fused, at least one rectifying element is reverse-biased. Therefore, no current flows from the terminal of the heater of one protection circuit to the terminal of the heater of the other protection circuit, which prevents the generation of a residual current.

CITATION LIST

Patent Document

[Patent Document 1]
Japanese Patent No. 4095426

SUMMARY OF INVENTION

Technical Problem

However, since the protection circuit of Patent Document 1 has a structure in which the fuses with a heater (hereinafter, also referred to as SCP) are bilaterally symmetrical, in a case where currents are cut off, the probability of one of the two fuse elements being cut off is 50%. Therefore, in a case where a plurality of SCPs are connected in parallel in the protection circuit, it is not possible to specify which of the two fuse elements in each SCP a portion where currents are cut off is. Therefore, there is a case where, depending on the cutoff portion formed in each SCP, a sneak current is generated in the protection circuit and an overcurrent flows from the power storage device to the external circuit. Therefore, in order to prevent overcurrents in the entire system, it is necessary to mount a plurality of rectifying elements (diodes) that correspond to the plurality of SCPs on a one-to-one basis, which causes problems with the circuits becoming complex, the cost increasing, and furthermore, an increase in the failure rate of the device arising from an increase in the number of components.

Furthermore, additional improvement in the performance and functions of mobile devices in recent years have further increased the charging capacities of secondary batteries, which creates a demand for highly safe protection circuits capable of reliably preventing overcurrents.

The present invention has been made in view of the above-described circumstances, and an object of the present invention is to provide a protection element and a protection circuit capable of reliably preventing overcurrents to improve safety, reducing costs with a simpler device configuration than ever, and furthermore, reducing the failure rate of the device.

Solution to Problem

In order to solve the above-described problems, the present invention employs the following means.

[1] A protection element according to one aspect of the present invention has a first fuse element and a second fuse element connected in series, a heater connected between the first fuse element and the second fuse element, a first electrode portion connected to the first fuse element on a side opposite to the second fuse element, a second electrode part connected to the second fuse element on a side opposite to the first fuse element, a third electrode part connected between the first fuse element and the second fuse element and connected to the heater in series, a conduction part connected to the third electrode part and having a lower resistance value than the heater, and a fourth electrode part connected to the conduction part and provided to be connectable to an external protection circuit.

[2] In the protection element according to the [1], it is preferable that a melting point of the conduction part is higher than a melting point of any of the first fuse element and the second fuse element.

[3] In the protection element according to any one of the [1] or [2], it is preferable that the conduction part is made of silver (Ag).

[4] In the protection element according to the [1], it is preferable that the first fuse element and the second fuse element are disposed on one main surface of a substrate and the heater is disposed on the other main surface side of the substrate.

[5] In the protection element according to the [1], it is preferable that the first fuse element and the second fuse element are disposed on one main surface side of a substrate and the heater is disposed between the one main surface of the substrate and the first fuse element and the second fuse element.

[6] In the protection element according to any one of the [4] or [5], the conduction portion may be formed of at least one through hole penetrating the substrate in a thickness direction.

[7] In the protection element according to the [6], the conduction portion may be formed of a plurality of through holes penetrating the substrate in the thickness direction.

[8] A protection circuit according to one aspect of the present invention is a protection circuit including a plurality of protection elements connected in parallel, in which each protection element configuring the plurality of protection elements has a first fuse element and a second fuse element connected in series, a heater connected between the first fuse element and the second fuse element, a first electrode portion connected to the first fuse element on a side opposite to the second fuse element, a second electrode part connected to the second fuse element on a side opposite to the first fuse element, a third electrode part connected between the first fuse element and the second fuse element and connected to the heater in series, a conduction part connected to the third electrode part and having a lower resistance value than the heater, and a fourth electrode part connected to the conduction part and provided to be connectable to an external protection circuit, the plurality of protection elements are connected in parallel, and the protection circuit includes a bypass circuit connecting a plurality of the fourth electrode parts provided in the plurality of protection elements.

[9] In the protection circuit according to the [8], it is preferable that a melting point of the conduction part is higher than a melting point of any of the first fuse element and the second fuse element.

[10] In the protection circuit according to any one of the [8] or [9], it is preferable that the conduction part is made of silver (Ag).

[11] In the protection circuit according to the [8], the first fuse element and the second fuse element may be disposed on one main surface side of a substrate, and the heater may be disposed on the other main surface side of the substrate.

[12] In the protection circuit according to the [8], the first fuse element and the second fuse element may be disposed on one main surface side of a substrate, and the heater may be disposed between the one main surface of the substrate and the first fuse element and the second fuse element.

[13] In the protection circuit according to the [8], the conduction part may be formed of at least one through hole penetrating the substrate in a thickness direction.

[14] In the protection circuit according to the [8], the conduction part may be formed of a plurality of through holes penetrating the substrate in a thickness direction.

Advantageous Effects of Invention

According to the present invention, it is possible to reliably prevent overcurrents to improve safety, reduce costs with a simpler device configuration than ever, and furthermore, reduce the failure rate of the device.

DESCRIPTION OF EMBODIMENTS

Hereinafter, protection elements and the protection circuits according to embodiments to which the present invention is applied will be described in detail using drawings. It should be noted that, in some of the drawings to be used in the following description, a characteristic portion is shown in an enlarged manner for convenience in order to facilitate the understanding of the characteristic, and the dimensional ratio and the like of each configurational element are not always the same as those in actual cases. In addition, materials, dimensions, and the like to be described in the following description are simply examples, and the present invention is not limited thereto and can be appropriately modified and carried out within the scope of the gist of the present invention.

[Configuration of Protection Element]

Figure 1:
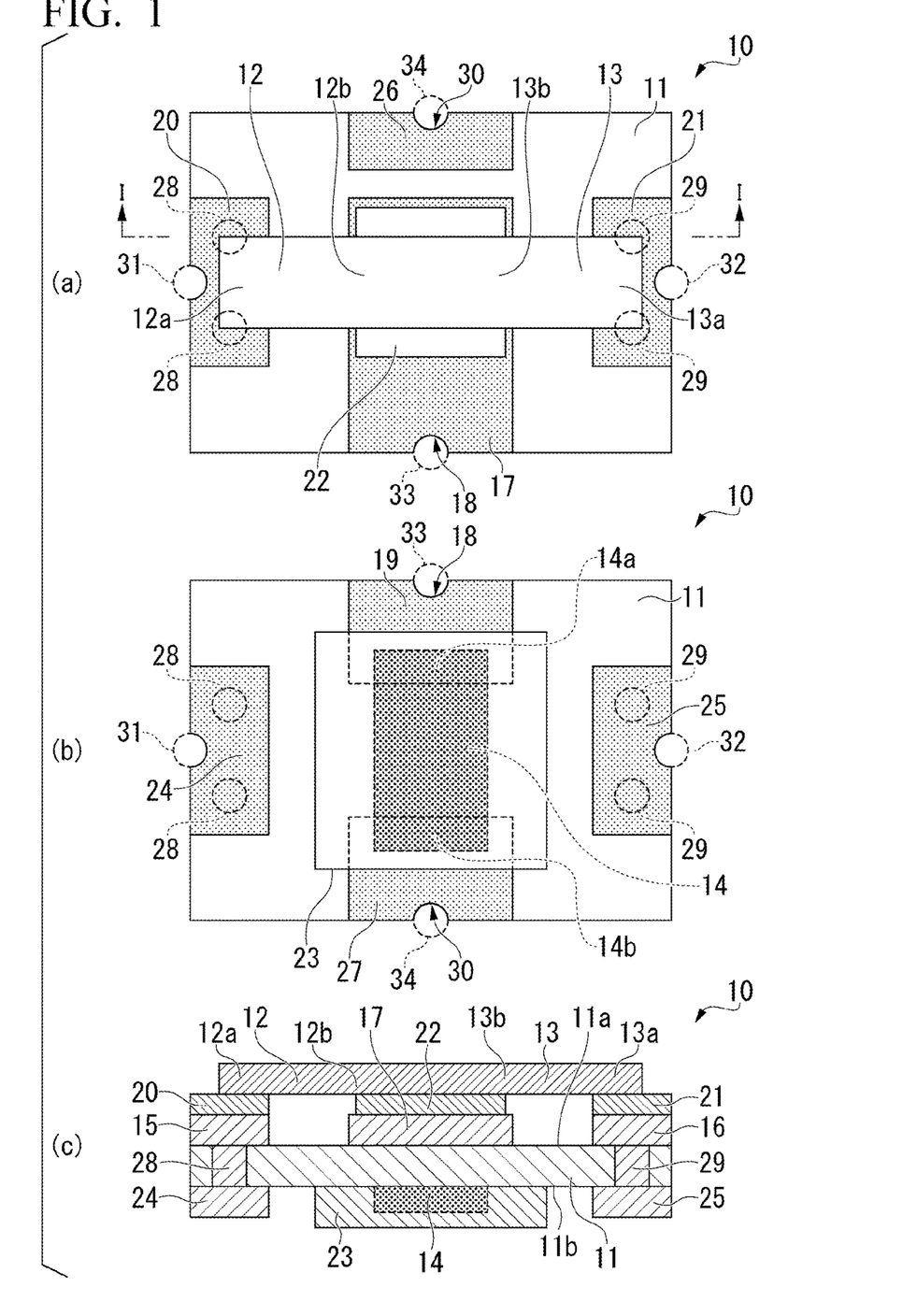
FIG. 1(a) is a top view schematically showing a configuration of a protection element according to a first embodiment of the present invention.
FIG. 1(b) is a bottom view.
FIG. 1(c) is a cross-sectional view taken along a line I-I of FIG. 1(a).

FIG. 1(a) is a top view schematically showing the configuration of a protection element according to a first embodiment of the present invention, FIG. 1(b) is a bottom view, and FIG. 1(c) is a cross-sectional view taken along a line I-I of FIG. 1(a). In addition, FIG. 2 is a schematic view showing a circuit configuration of the protection element of FIG. 1.

Figure 2:
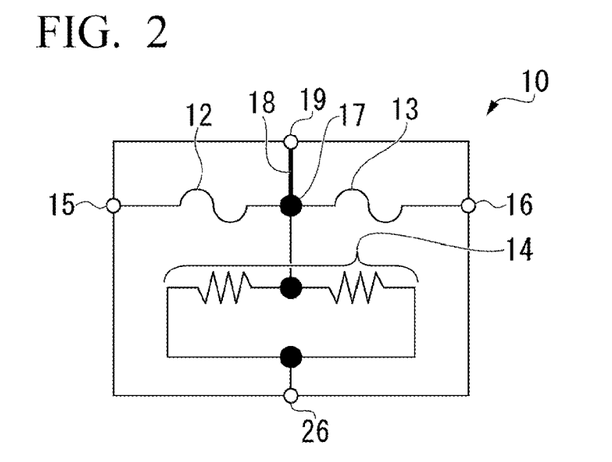
FIG. 2 is a schematic view showing a circuit configuration of the protection element of FIG. 1.

As shown in FIG. 1 (a), FIG. 1 (b), and FIG. 2, a protection element 10 has a substrate 11, a first fuse element 12 and a second fuse element 13 connected in series on the substrate 11, a heater 14 connected between the first fuse element 12 and the second fuse element 13, a first upper electrode portion 15 (first electrode portion) connected to the first fuse element 12 on a side opposite to the second fuse element 13, a second upper electrode portion 16 (second electrode portion) connected to the second fuse element 13 on a side opposite to the first fuse element 12, a third upper electrode portion 17 (third electrode portion) connected between the first fuse element 12 and the second fuse element 13 and connected to the heater 14 in series, a first conduction portion 18 (conduction portion) connected to the third upper electrode portion 17 and having a lower resistance value than the heater 14, and a third lower electrode portion 19 (fourth electrode portion) connected to the first conduction portion 18 and configured to be connectable to an external protection circuit described below. Serial connection in the present embodiment means direct connection with no other materials interposed.

The substrate 11 is not particularly limited as long as the substrate is an insulating material, and, for example, not only a substrate that is used for printed wiring boards such as a ceramic substrate or a glass epoxy substrate, but also a glass substrate, a resin substrate, an insulated metal substrate, or the like can be used. It should be noted that, among these, a ceramic substrate, which is an insulating substrate having excellent heat resistance and favorable thermal conductivity, is preferable.

The first fuse element 12 and the second fuse element 13 of the present embodiment are provided on one main surface 11a side of the substrate 11. One end portion 12a of the first fuse element 12 is connected to the first upper electrode portion 15 through a first support 20. One end portion 13a of the second fuse element 13 is connected to the second upper electrode portion 16 through a second support 21. The other end portion 12b of the first fuse element 12 and one end portion 13b of the second fuse element 13 are connected to the third upper electrode portion 17 through a third support 22.

The first fuse element 12 and the second fuse element 13 are, for example, integrally formed and are supported by the first upper electrode portion 15, the second upper electrode portion 16, and the third upper electrode portion 17 through three conductive supports of the first support 20, the second support 21, and the third support 22. The first fuse element 12 and the second fuse element 13 may be formed of separate members. In addition, the shapes of the first fuse element 12 and the second fuse element 13 are thin section shapes, but are not limited thereto, and may be rod shapes.

The first fuse element 12 of the present embodiment has the same thermal characteristics as the thermal characteristics of the second fuse element 13. The thermal characteristics include at least one of thermal resistance and heat capacity. The thermal resistance (K/W) means easiness in heat transfer, and, as the thermal resistance becomes higher, heat transfer becomes more difficult (thermal resistance [K/W]=length [m]/{cross-sectional area [m$^2$]×heat conductivity [W/(m·K)]}). In addition, the heat capacity (J/K) means the amount of heat required to raise a unit temperature, that is, easiness in temperature change, and, as the heat capacity becomes larger, temperature change becomes more difficult. Here, the thermal characteristics of the first fuse element 12 and the second fuse element 13 do not need to be the same at all times, and these thermal characteristics may be different to an extent that the operation of a protection circuit described below is not affected.

The first fuse element 12 and the second fuse element 13 of the present embodiment have, for example, thin section shapes that are uniform in width and thickness, and the length of the first fuse element 12 is the same as the length of the second fuse element 13. In this case, the thermal resistance of the first fuse element 12 is the same as the thermal resistance of the second fuse element 13.

As materials that configure the first fuse element 12 and the second fuse element 13, a variety of low-melting point metals that have been conventionally used as fuse materials can be used. Examples of the low-melting point metals include SnSb alloys, BiSnPb alloys, BiPbSn alloys, BiPb alloys, BiSn alloys, SnPb alloys, SnAg alloys, PbIn alloys, ZnAl alloys, InSn alloys, PbAgSn alloys, and the like. The materials that configure a first fuse element 12A and a second fuse element 13A are preferably the same, but may be different.

The heater 14 of the present embodiment is provided on the other main surface 11b side of the substrate 11. This heater 14 is disposed in contact with the other main surface 11b of the substrate 11 and is disposed immediately below the third upper electrode portion 17. In addition, the heater 14 is connected to the third lower electrode portion 19 at one end portion 14a and connected to a fourth lower electrode portion described below at the other end portion 14b. The heater 14 is provided on a side opposite to the first fuse element 12 and the second fuse element 13 of the substrate 11 as described above, which makes it possible to reduce the height of the protection element 10 and makes it possible to increase the degree of freedom in mounting spaces at the time of mounting the protection element 10 on a protection circuit described below.

The heater 14 is formed by applying a resistance paste made up of a conductive material such as ruthenium oxide or carbon black and an inorganic binder such as water glass or an organic binder such as a thermosetting resin and sintering the resistance paste as necessary. In addition, as the heater 14, a thin film of ruthenium oxide, carbon black, or the like may be formed through steps of printing, plating, vapor deposition, and sputtering or the heater may be formed by sticking, laminating, or the like these films.

On the heater 14, an insulating member 23 is provided so as to coat the outer surface thereof. A material that configures the insulating member 23 is not particularly limited as long as the material is capable of insulating the heater 14 from the outside, and examples thereof include glass ($SiO_2$).

The first upper electrode portion 15, the second upper electrode portion 16, and the third upper electrode portion 17 are each an electrode into which the melted first fuse element 12 or second fuse element 13 flows. Materials that configure the first upper electrode portion 15, the second upper electrode portion 16, and the third upper electrode portion 17 are not particularly limited, and examples thereof include metals having favorable wettability to the first fuse element 12 or second fuse element 13 in a molten state.

As the materials that configure the first upper electrode portion 15, the second upper electrode portion 16, and the third upper electrode portion 17, it is possible to use a single metal such as copper (Cu) or a material having at least a surface composed of silver (Ag), silver (Ag)-platinum (Pt), silver (Ag)-palladium (Pd), gold (Au), or the like.

The first upper electrode portion 15, the second upper electrode portion 16, and the third upper electrode portion 17 of the present embodiment are provided on the one main surface 11a side of the substrate 11. On the other main surface 11b side of the substrate 11, a first lower electrode portion 24, a second lower electrode portion 25, and the third lower electrode portion 19 that each form a pair with the first upper electrode portion 15, the second upper electrode portion 16, and the third upper electrode portion 17 are provided. Examples of materials that configure the first lower electrode portion 24 and the second lower electrode portion 25 include copper (Cu), silver (Ag), and the like. Examples of a material that configures the third lower electrode portion 19 include copper (Cu), silver (Ag), alloys thereof, and the like, and, among these, silver or a silver alloy is preferable. Examples of the silver alloy include Ag—Pt and Ag—Pd. In addition, in a case where the material that configures the third lower electrode portion 19 is silver or a silver alloy, it is possible to use a material having a surface formed of nickel (Ni)-gold (Au).

In addition, a fourth upper electrode portion 26 is provided on the one main surface 11a side of the substrate 11, and a fourth lower electrode portion 27 that forms a pair with the fourth upper electrode portion 26 is provided on the other main surface 11b side of the substrate 11. Examples of materials that configure the fourth upper electrode portion 26 and the fourth lower electrode portion 27 include copper (Cu), silver (Ag), and the like.

The first upper electrode portion 15 and the second upper electrode portion 16 are each connected to the first lower electrode portion 24 and the second lower electrode portion 25 through a second conduction portion 28 and a third conduction portion 29. The second conduction portion 28 and the third conduction portion 29 are each, for example, one or a plurality of through holes having a substantially circular shape in a plan view in the longitudinal direction and are formed by filling the inner peripheral surface of the through hole formed in the substrate 11 or the entire through hole with a conductor. Examples of materials that configure the second conduction portion 28 and the third conduction portion 29 include silver (Ag), copper (Cu), tungsten (W), alloys thereof, and the like.

The second conduction portion 28 and the third conduction portion 29 may be formed of either or both of through holes having a substantially circular shape in a plan view and castellations described below. In addition, the second conduction portion 28 and the third conduction portion 29 may have a configuration other than through holes as long as the conduction portions are configured so as to be conductive with external circuits. In addition, the protection element 10 may have a configuration not having the second conduction portion 28 and the third conduction portion 29.

The third upper electrode portion 17 is connected to the third lower electrode portion 19 (fourth electrode portion) through the first conduction portion 18. The first conduction portion 18 is, for example, one or a plurality of through holes having a substantially semicircular shape in a plan view (also referred to as castellations) and is formed by filling the inner peripheral surface of the through hole formed in the end face of the substrate 11 with a conductor. The first conduction portion 18 of the present embodiment configures a bypass conductor that is connected to a bypass circuit described below through the third lower electrode portion 19.

The melting point of the first conduction portion 18 is preferably higher than the melting point of any of the first fuse element 12 and the second fuse element 13. Examples of a material that configures the first conduction portion 18 include silver, copper, tungsten, alloys thereof, and the like and preferably include silver. Since copper is easily oxidized or tungsten has poor wettability to solder, a plating treatment is required as a surface treatment, and the manufacturing costs increase. On the other hand, silver has a low conductor resistance value and is not easily oxidized and thus has favorable wettability to solder. When the first conduction portion 18 is composed of silver, it is possible to reliably cause an overcurrent to flow into the bypass circuit 5 described below through the first conducting portion 18 while reducing the manufacturing costs compared with copper or tungsten.

The first conduction portion 18 may be formed of any of a castellation and a through hole. In addition, the first conduction portion 18 may have a configuration other than a castellation or a through hole as long as the conduction portion is configured so as to be conductive with external circuits.

In addition, the fourth upper electrode portion 26 of the present embodiment is connected to the fourth lower electrode portion 27 through the fourth conduction portion 30. Similar to the first conduction portion 18, the fourth conduction portion 30 is, for example, one or a plurality of through holes having a substantially semicircular shape in a plan view. Examples of a material that configures the fourth conduction portion 30 include silver, copper, tungsten, alloys thereof, and the like. The fourth conduction portion 30 may be formed of either or both of a castellation and a through hole having a substantially circular shape in a plan view. In addition, the fourth conduction portion 30 may have a configuration other than a castellation or a through hole as long as the conduction portion is configured so as to be conductive with external circuits. In addition, the protection element 10 may have a configuration not having the fourth conduction portion 30.

Solder portions 31, 32, 33, and 34 are each provided at positions corresponding to the first upper electrode portion 15, the second upper electrode portion 16, the third upper electrode portion 17, and the fourth upper electrode portion 26.

The first upper electrode portion 15, the second upper electrode portion 16, the third upper electrode portion 17, and the fourth upper electrode portion 26 are connected to external circuits (protection circuit) through the solder portions 31, 32, 33, and 34.

In the protection element 10 configured as described above, when a large current exceeding the current rating flows into the protection element 10, the first fuse element 12 and/or the second fuse element 13 is fused by self-generated heat (Joule heat) or the first fuse element 12 and/or the second fuse element 13 is fused by heat generated by the heater 14, whereby a current path is cut off.

Next, an example of a method for manufacturing the protection element 10 will be briefly described. First, the first upper electrode portion 15, the second upper electrode portion 16, the third upper electrode portion 17 (also referred to as the central electrode), and the fourth upper electrode portion 26 are formed on the one main surface 11a side of the substrate 11. In a case where a substantially circular through hole corresponding to the second conduction portion 28 or the third conduction portion 29 is formed, the through hole may be formed in advance in the substrate 11 before the formation of the first to fourth upper electrode portions.

Next, the first lower electrode portion 24, the second lower electrode portion 25, the third lower electrode portion 19, and the fourth lower electrode portion 27 are formed at positions corresponding to the first upper electrode portion 15, the second upper electrode portion 16, the third upper electrode portion 17, and the fourth upper electrode portion 26 on the other main surface 11b side of the substrate 11. Next, the first conduction portion 18, the second conduction portion 28, the third conduction portion 29, and the fourth conduction portion 30 are each formed at positions corresponding to the first to fourth lower electrode portions. For example, castellations are each formed at positions corresponding to the first to fourth lower electrode portions on the four side surfaces of the substrate 11. This makes the first to fourth upper electrode portions each connected to the first to fourth lower electrode portions through the first to fourth conduction portions.

After that, the heater 14 is formed between the third lower electrode portion 19 and the fourth lower electrode portion 27 on the other main surface 11b side of the substrate 11 to connect these electrode portions, and furthermore, the insulating member 23 is formed on the heater 14.

Next, the first support 20, the second support 21, and the third support 22 are each formed on the first upper electrode portion 15, the second upper electrode portion 16, and the third upper electrode portion 17, and the first fuse element 12 and the second fuse element 13 are fixed so as to straddle the first to third supports. The protection element 10 is obtained by the above-described steps.

[Configuration of Protection Circuit]

Figure 3:
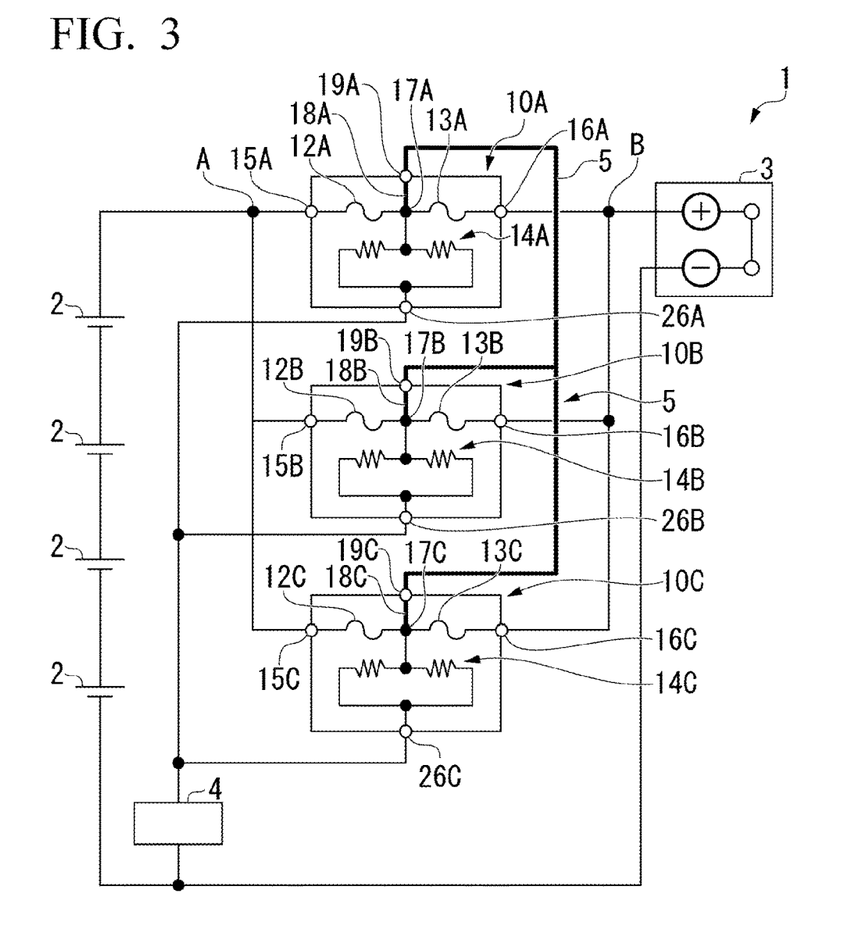
FIG. 3 is a view schematically showing a configuration of a protection circuit according to a second embodiment of the present invention.

FIG. 3 is a view schematically showing the configuration of a protection circuit according to a second embodiment of the present invention. In the protection circuit of the present second embodiment, a plurality of the protection elements 10 of the first embodiment are mounted on the surface. This protection circuit configures, for example, a circuit in a battery pack of a lithium-ion secondary battery.

As shown in FIG. 3, in a protection circuit 1, a plurality of protection elements 10A, 10B, and 10C are connected in parallel. Specifically, a plurality of first upper electrode portions 15A, 15B, and 15C of the plurality of protection elements 10A, 10B, and 10C are connected to a parallel connection point A through external circuits and connected to positive electrodes of secondary batteries 2, 2, . . . . In addition, a plurality of second upper electrode portions 16A, 16B, and 16C of the plurality of protection elements 10A, 10B, and 10C are connected to a parallel connection point B through external circuits and connected to a positive electrode of a charger 3. A plurality of third upper electrode portions 17A, 17B, and 17C of the plurality of protection elements 10A, 10B, and 10C are each connected to both negative electrodes of the secondary batteries 2, 2, . . . and a negative electrode of the charger 3. A switching element 4 such as an FET is provided on the downstream side of the third upper electrode portion 17A, 17B, and 17C.

This protection circuit 1 has a bypass circuit 5 that connects a plurality of third lower electrode portions 19A, 19B, and 19C provided in the plurality of protection elements 10A, 10B, and 10C. The bypass circuit 5 is, for example, a circuit pattern that is mounted on a substrate. Examples of a material that configures the bypass circuit 5 include copper, silver, and the like, and, among these, silver is preferable. The bypass circuit 5 can be formed using a known method for forming a circuit pattern on substrates.

At the time of charging the secondary batteries 2, 2, . . . , electric power is supplied from the charger 3 through an external circuit to the secondary batteries 2, 2, . . . . In addition, at the time of discharging the secondary batteries, electric power is supplied from the secondary batteries 2, 2, . . . to the external circuit. As described above, in both cases of charging and discharging the secondary batteries 2, 2, . . . , the same electric power is supplied to both of the first fuse elements 12A (12B, and 12C) and the second fuse elements 13A (13B, and 13C).

The protection circuit 1 may have a detection element (not shown) connected to each of the secondary batteries 2, 2 . . . and connected to the switching element 4. This detection element constantly monitors a high voltage state, particularly, whether or not overvoltage is caused and outputs a control signal to the switching element 4 in a case where a high voltage state is formed. In this case, the switching element 4 causes currents to flow from the secondary batteries 2, 2, . . . to the heaters 14A (14B, and 14C) according to a detection signal, whereby the heaters 14A (14B, and 14C) generate heat. This makes it possible to fuse the first fuse elements 12A (12B, and 12C) and/or the second fuse elements 13A (13B, and 13C).

[Operation of Protection Circuit]

Figure 4:
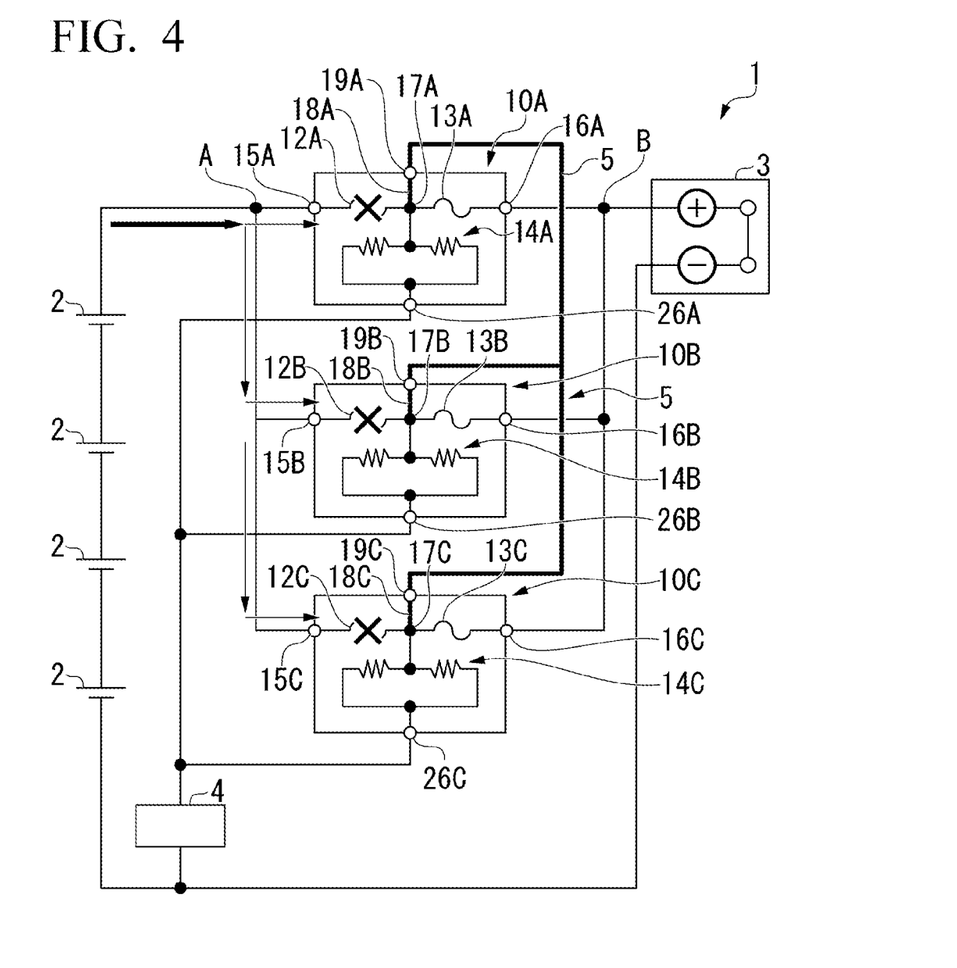
FIG. 4 is a view for describing a first case where a current is cut off in the protection circuit of FIG. 3.

Next, the operation of the protection circuit 1 of FIG. 3 will be described using the following first to fourth cases. FIG. 4 is a view for describing the first case where a current is cut off in the protection circuit 1 of FIG. 3. For example, as the first case, a case where an overcurrent flows due to the occurrence of an external short circuit or the like and the plurality of first fuse elements 12A, 12B, and 12C are fused is assumed. In the case of the first case, since all of the first fuse elements 12A, 12B, and 12C are fuse elements on the secondary battery side, the fusion of the first fuse elements 12A, 12B, and 12C cuts off currents in the circuits on the side of the secondary batteries 2, 2, . . . and in the circuits on the charger 3 side.

Figure 5:
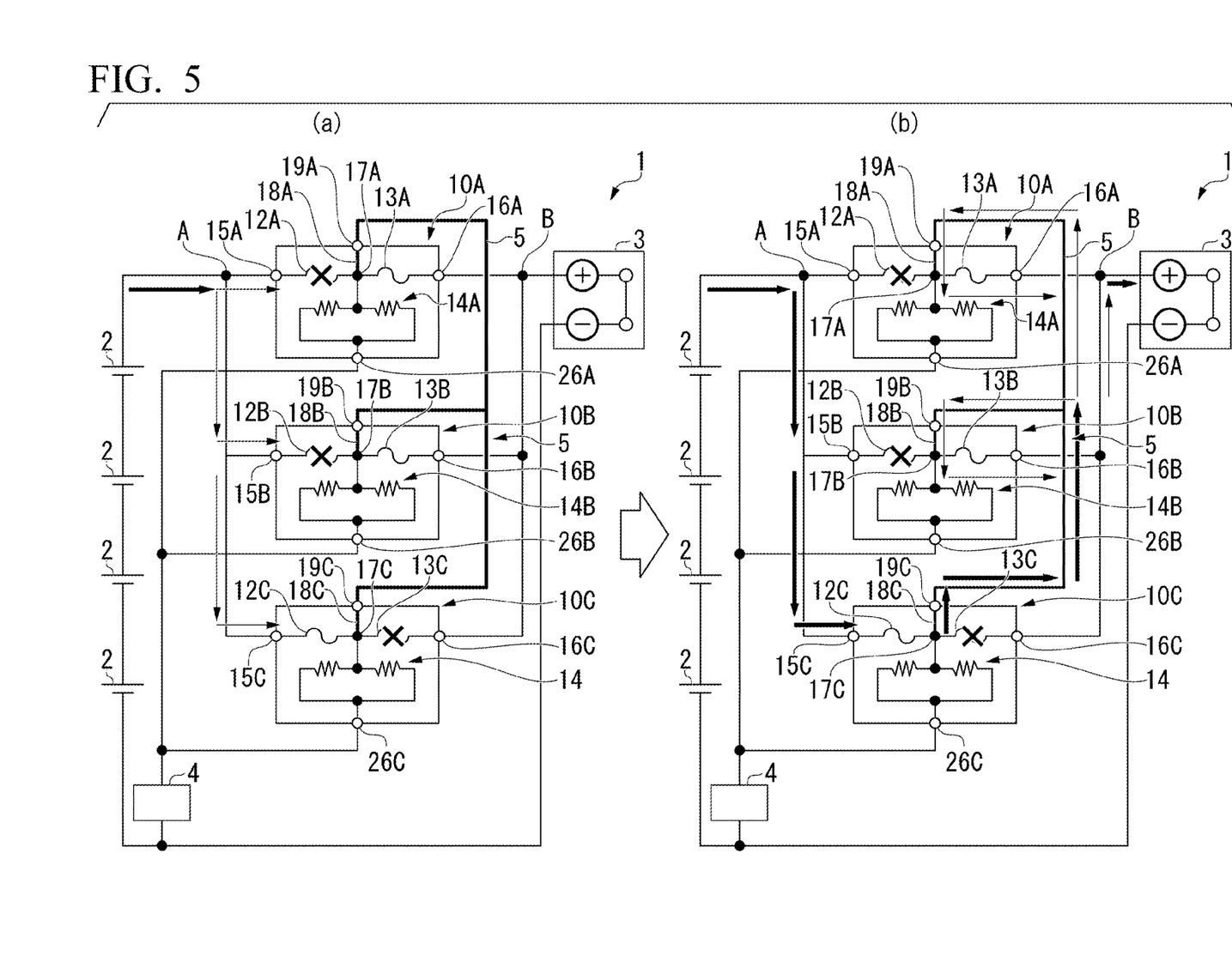
FIG. 5(a) and FIG. 5(b) are views for describing a second case where a current is cut off in the protection circuit of FIG. 3.
Figure 6:
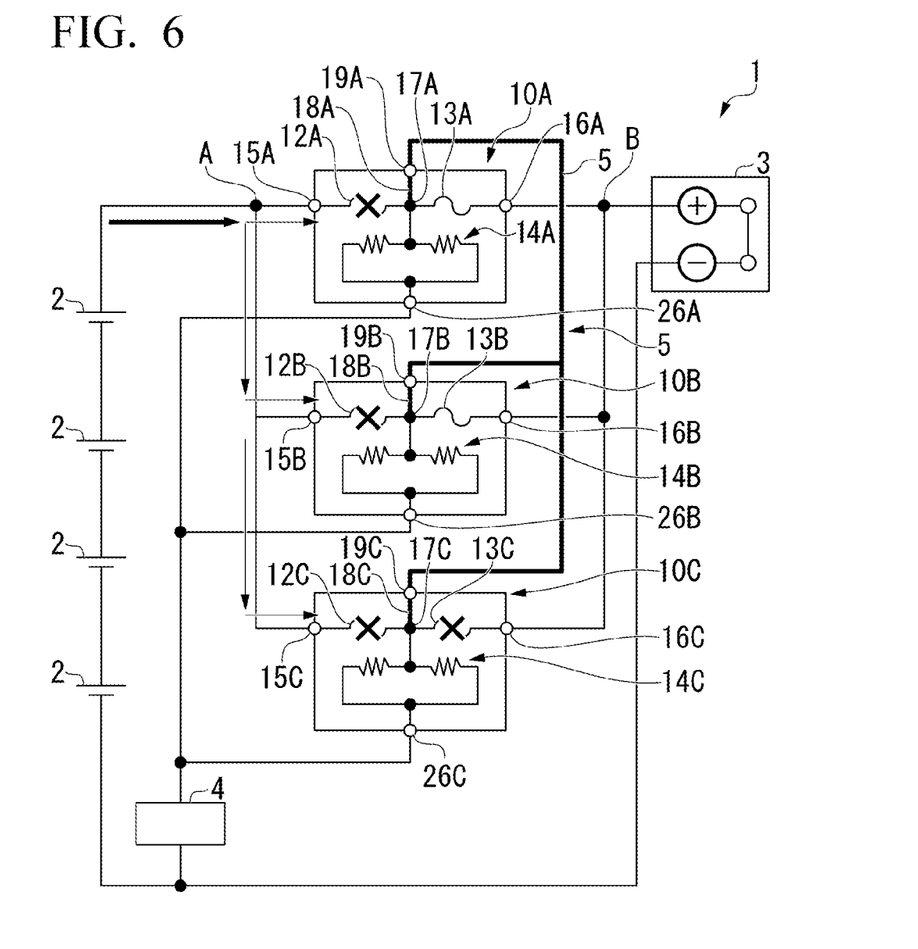
FIG. 6 is a view for describing the next of the second case shown in FIG. 5.

FIG. 5(a) and FIG. 5(b) and FIG. 6 are views for describing the second case where a current is cut off in the protection circuit 1 of FIG. 3. As the second case, a case where the plurality of first fuse elements 12A and 12B and the second fuse element 13C are fused due to an overcurrent as shown in FIG. 5(a) is assumed. In this case, since the first fuse elements 12A and 12B are fuse elements on the secondary battery side and the second fuse element 13C is a fuse element on the charger side, currents are not cut off on the side of the secondary batteries 2, 2, . . . and on the charger 3 side, and a current flows through the first fuse element 12C. At this time, since the first conduction portion 18C having a lower resistance value than the heater 14C is provided in the protection element 10C, and the first conduction portion 18C is connected to the bypass circuit 5 through the third lower electrode portion 19C, a current flows from the secondary battery side through the bypass circuit 5 to the charger side (FIG. 5 (b)). In addition, the current flows through the bypass circuit 5, whereby the current concentrates on the first fuse element 12C, and the first fuse element 12C is rapidly fused (FIG. 6). As a result, currents are cut off in the circuits on the side of the secondary batteries 2, 2, . . . and in the circuits on the charger 3 side.

Figure 7:
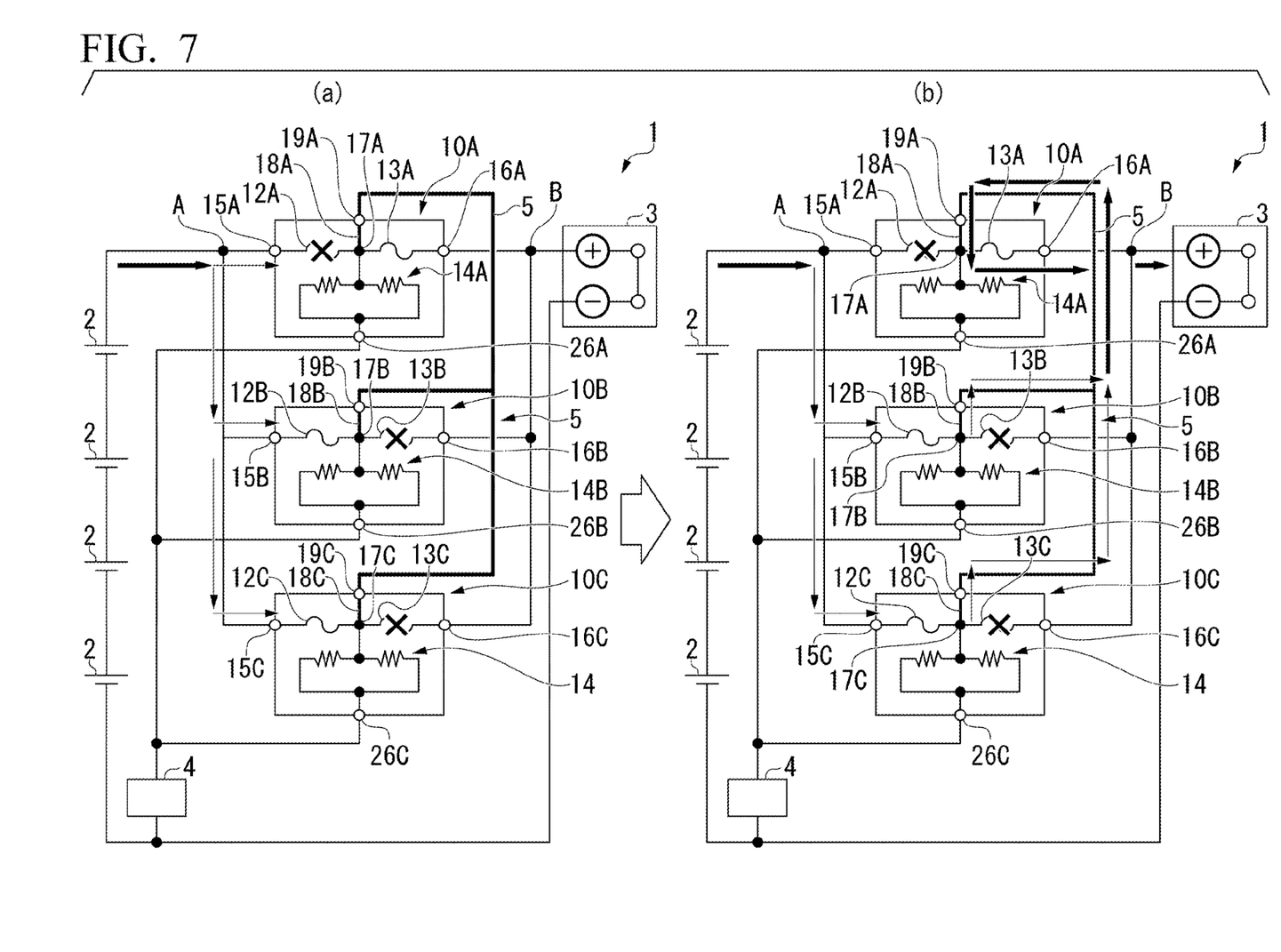
FIG. 7(a) and FIG. 7(b) are views for describing a third case where a current is cut off in the protection circuit of FIG. 3.
Figure 8:
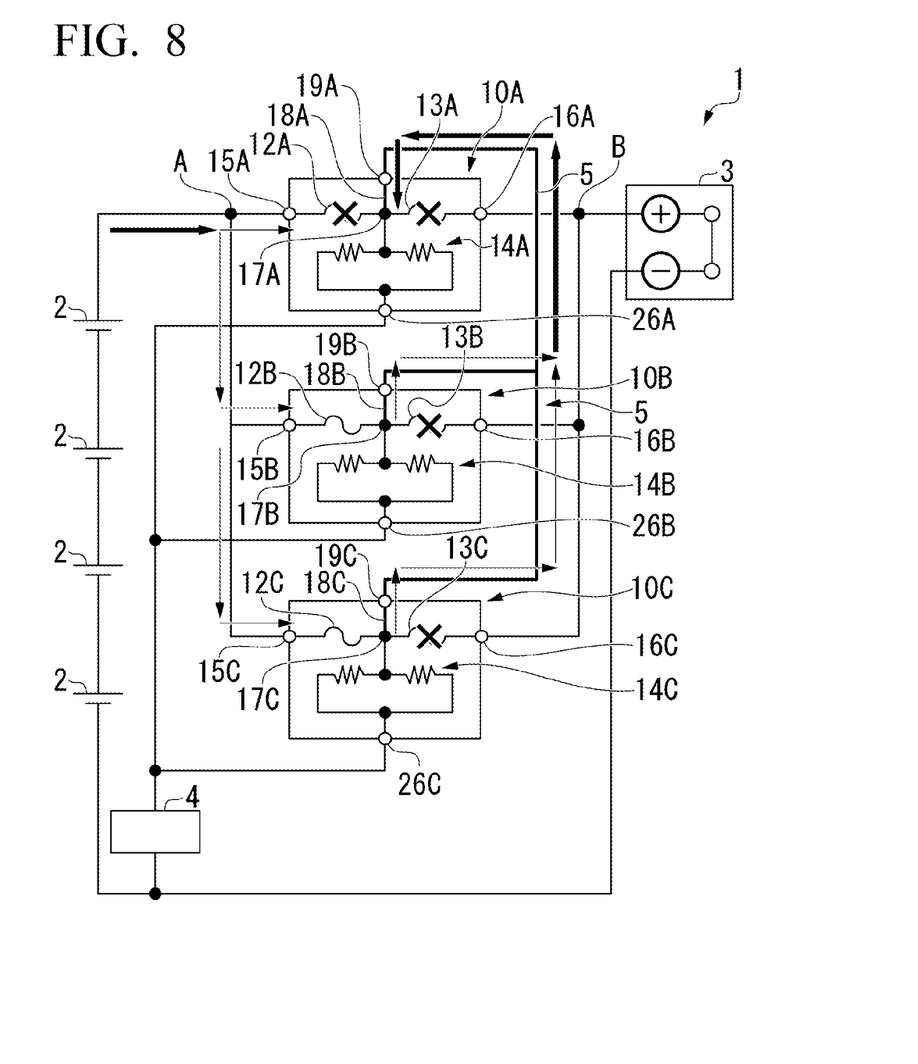
FIG. 8 is a view for describing the next of the third case shown in FIG. 7.

FIG. 7(a) and FIG. 7(b) and FIG. 8 are views for describing the third case where a current is cut off in the protection circuit 1 of FIG. 3. As the third case, a case where the first fuse element 12A and the plurality of second fuse elements 13B and 13C are fused due to an overcurrent as shown in FIG. 7(a) is assumed. In this case, since the first fuse element 12A is a fuse element on the secondary battery side and the second fuse elements 13B and 13C are fuse elements on the charger side, similar to the second case, currents are not cut off on the side of the secondary batteries 2, 2, . . . and on the charger 3 side, and a current flows through the first fuse elements 12B and 12C. At this time, the first conduction portion 18B having a lower resistance value than the heater 14B is provided in the protection element 10B, and the first conduction portion 18C having a lower resistance value than the heater 14C is provided in the protection element 10C. In addition, since the first conduction portions 18B and 18C are each connected to the bypass circuit 5 through the third lower electrode portions 19B and 19C, a current flows from the secondary battery side through the bypass circuit 5 to the charger side (FIG. 7(b)). In addition, the current flows through the bypass circuit 5, whereby the current concentrates on the second fuse element 13A, and the second fuse element 13A is rapidly fused (FIG.

8). As a result, currents are cut off in the circuits on the side of the secondary batteries 2, 2, . . . and in the circuits on the charger 3 side.

Figure 9:
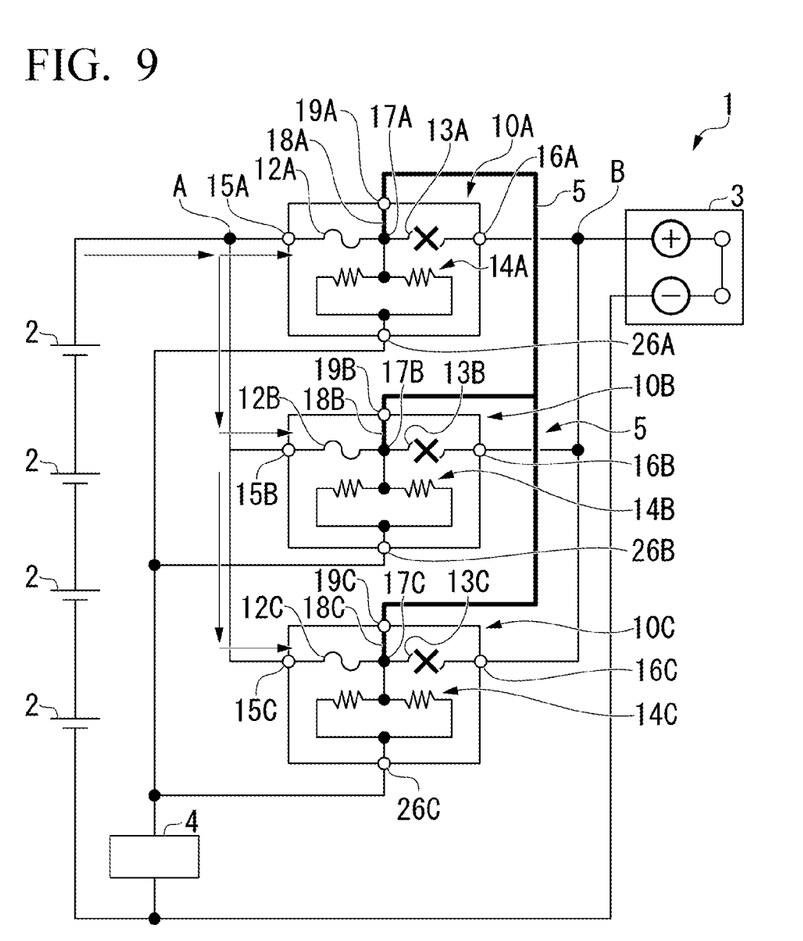
FIG. 9 is a view for describing a fourth case where a current is cut off in the protection circuit of FIG. 3.

FIG. 9 is a view for describing the fourth case where a current is cut off in the protection circuit 1 of FIG. 3. As the fourth case, a case where the plurality of second fuse elements 13A, 13B, and 13C are fused due to an overcurrent is assumed. In the case of the fourth case, since all of the second fuse elements 13A, 13B, and 13C are fuse elements on the secondary battery side, the fusion of the second fuse elements 13A, 13B, and 13C cuts off currents in the circuits on the side of the secondary batteries 2, 2, . . . and in the circuits on the charger 3 side.

As described above, a plurality of fusing patterns of the first fuse elements 12A, 12B, and 12C and the second fuse elements 13A, 13B, and 13C are assumed in a case where an overcurrent is generated; however, in all of the first to fourth cases described above, currents are cut off in the circuits on the side of the secondary batteries 2, 2, . . . and in the circuits on the charger 3 side.

As described above, according to the present embodiments, since the protection element 10 has the first conduction portion 18 that is connected to the third upper electrode portion 17 and has a lower resistance value than the heater 14 and the third lower electrode portion 19 that is connected to the first conduction portion 18 and provided to be connectable to the external protection circuit 1, even in a case where the first fuse element 12 and the second fuse element 13 have the same thermal characteristics, in the first fuse element 12 (or the second fuse element 13), it is possible to cut off the circuit on one side and the circuit on the other side of the first fuse element 12 (or the second fuse element 13). Therefore, in the case of forming the protection circuit 1 including the plurality of protection elements 10A, 10B, and 10C connected in parallel, it is possible to reliably prevent overcurrents without providing a rectifying element such as a diode. In addition, the first conduction portion 18 and the third lower electrode portion 19 are a simple configuration and can be easily formed compared with a case where a rectifying element is mounted on a substrate. Therefore, it is possible to reliably prevent overcurrents to improve safety, reduce costs with a simpler device configuration than ever, and furthermore, reduce the failure rate of the device.

In addition, since the melting point of the first conducting portion 18 is higher than the melting point of any of the first fuse element 12 and the second fuse element 13, it is possible to reliably cause overcurrents to flow through the first conducting portion 18 and the third lower electrode portion 19 to the external protection circuit 1. Therefore, it is possible to more reliably prevent overcurrents to further improve the safety.

In addition, according to the present embodiments, since the protection circuit 1 has the plurality of protection elements 10A, 10B, and 10C connected in parallel and the bypass circuit 5 that connects the plurality of third lower electrode portions 19A, 19B, and 19C provided in the plurality of protection elements 10A, 10B, and 10C, in any of the first fuse element 12A and the second fuse element 13A, any of the first fuse element 12B and the second fuse element 13B, and any of the first fuse element 12C and the second fuse element 13C, it is possible to cut off the circuits on the side of the secondary batteries 2, 2, . . . and the circuits on the charger 3 side and to reliably prevent overcurrents without providing a rectifying element such as a diode. In addition, the bypass circuit 5 is a simple configuration and can be easily formed compared with a case where a rectifying element or the like is mounted on a substrate. Therefore, it is possible to reliably prevent overcurrents to improve safety, reduce costs with a simpler device configuration than ever, and furthermore, reduce the failure rate of the device.

In addition, since the melting point of the first conducting portion 18A (18B, or 18C) is higher than the melting point of any of the first fuse element 12A (12B, or 12C) and the second fuse element 13A (13B, or 13C), it is possible to reliably cause overcurrents to flow through the first conducting portion 18A (18B, or 18C) and the third lower electrode portion 19A (19B, or 19C) to the bypass circuit 5 in the protection circuit 1. Therefore, it is possible to more reliably prevent overcurrents to further improve the safety.

Figure 10:
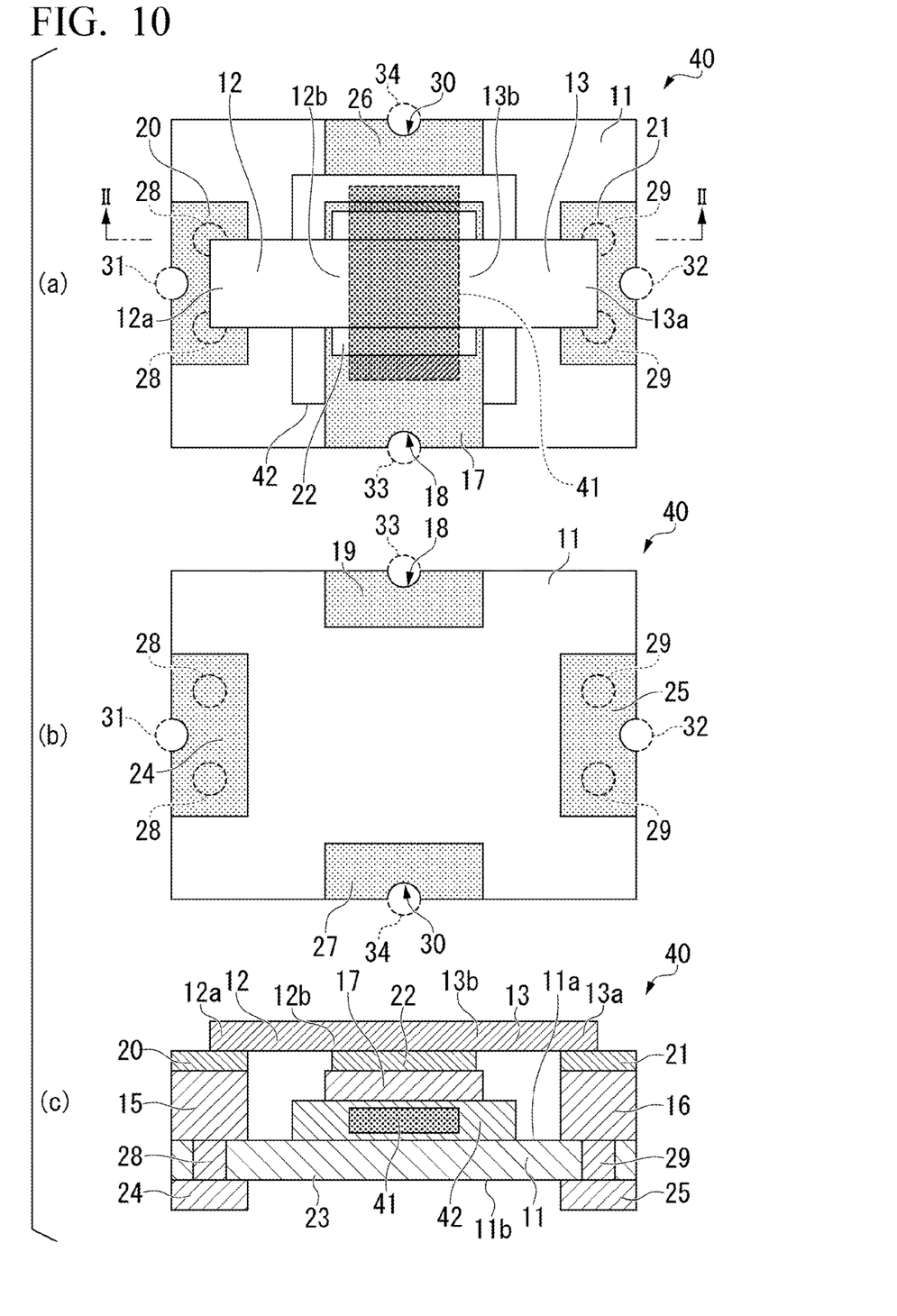
FIG. 10(a) is a top view showing a modification example of the protection element of FIG. 1.
FIG. 10(b) is a bottom view.
FIG. 10(c) is a cross-sectional view taken along a line II-II of FIG. 10(a).

FIG. 10(a) is a top view showing a modification example of the protection element 10 of FIG. 1, FIG. 10(b) is a bottom view, and FIG. 10(c) is a cross-sectional view taken along a line II-II of FIG. 10(a). Since the protection element of FIG. 10 is the same as the protection element 10 of FIG. 1 except that the disposition of a heater is different, duplicate portions will not be described again, and different portions will be described below.

As shown in FIG. 10(a) to FIG. 10 (c), a protection element 40 has a heater 41 connected between the first fuse element 12 and the second fuse element 13, the third upper electrode portion 17 (third electrode portion) connected between the first fuse element 12 and the second fuse element 13 and connected to the heater 41 in series, and the first conduction portion 18 (conducting portion) connected to the third upper electrode portion 17 and having a lower resistance value than the heater 41. The circuit configuration of the protection element 40 is the same as the circuit configuration of the protection element 10 (refer to FIG. 2).

The heater 41 is disposed on the one main surface 11a side of the substrate 11 and below the first fuse element 12 and the second fuse element 13. That is, the heater 41 is disposed between the one main surface 11a of the substrate 11 and the first fuse element 12 and the second fuse element 13. In the present modification example, the heater 41 is disposed in contact with the one main surface 11a of the substrate 11 and disposed immediately below the third electrode portion 17. In addition, an insulating layer 42 is disposed between the heater 41 and the third electrode portion 17. The heater 41 is provided on the same side of the substrate 11 as the first fuse element 12 and the second fuse element 13 as described above, which makes it possible to improve the heating efficiency at the time of fusing the first fuse element 12 and/or the second fuse element 13 and to accurately cut off a current path.

Figure 11:
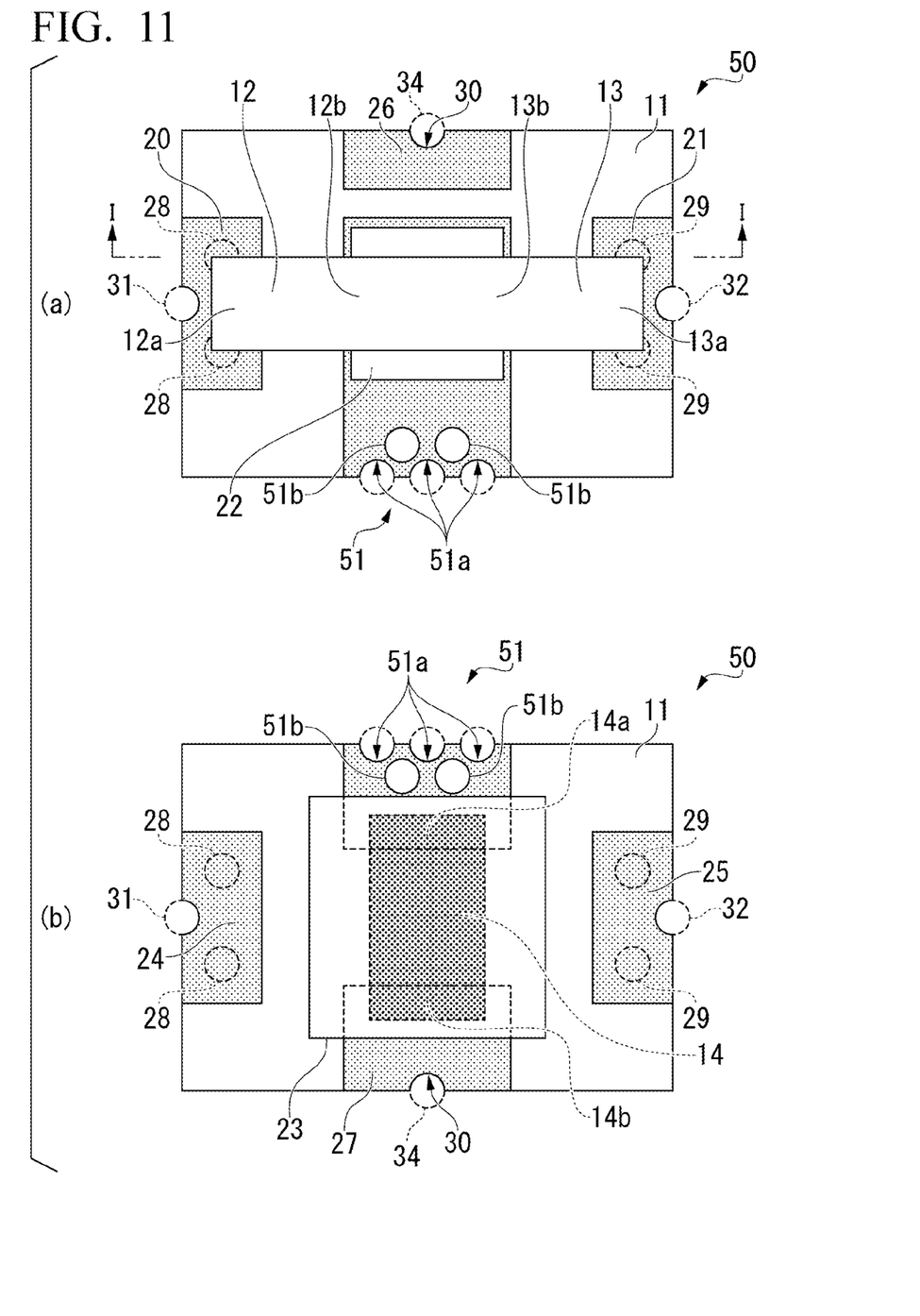
FIG. 11(a) is a top view showing a modification example of the conduction part in FIG. 1.
FIG. 11(b) is a bottom view.

FIG. 11(a) is a top view showing a modification example of the first conduction portion 18 in FIG. 1, and FIG. 11(b) is a bottom view. A protection element 50 of FIG. 9 is the same as the protection element 10 of FIG. 1 except that the configuration of a first energization portion is different.

As shown in FIG. 11(a) and FIG. 11(b), the protection element 50 has a first conduction portion 51 (conduction portion) that is connected to the third upper electrode portion 17 and has a lower resistance value than the heater 14. The first conduction portion 51 is made up of a plurality of through holes provided in the substrate 11. In the present modification example, the first conduction portion 51 is made up of a plurality of first through holes 51a, 51a, and 51a and a plurality of second through holes 51b and 51b having a different shape from that of the first through hole. The first through hole 51a of the present modification example is a castellation, and the second through hole 51b is a through hole having a substantially circular in a plan view. A material that configures the first conducting portion 51 is the same as that of the first conducting portion 18. The first conduction portion 51 is made up of a plurality of through holes as described above, which makes it possible to further decrease the electric resistance of the first conduction portion 51, to reliably causes an overcurrent to flow to the bypass circuit 5 through the first conduction portion 51 when the overcurrent has flowed into the first fuse element 12, and to accurately operate the protection circuit 1.

Hitherto, the embodiments of the present invention have been described in detail, but the present invention is not limited to the above-described embodiments and can be transformed or modified in a variety of manners within the scope of the gist of the present invention described in the claims.

REFERENCE SIGNS LIST

1: Protection circuit
2: Secondary battery
3: Charger
4: Switching element
5: Bypass circuit
10: Protection element
10A: Protection element
10B: Protection element
10C: Protection element
11: Substrate
11a: Main surface
11b: Main surface
12: First fuse element
12A: First fuse element
12B: First fuse element
12C: First fuse element
12a: One end portion
12b: The other end portion
13: Second fuse element
13A: Second fuse element
13B: Second fuse element
13C: Second fuse element
13a: One end portion
13b: One end portion
14: Heater
14A: Heater
14B: Heater
14C: Heater
14a: One end portion
14b: The other end portion
15: First upper electrode portion
15A: First upper electrode portion
15B: First upper electrode portion
15C: First upper electrode portion
16: Second upper electrode portion
16A: Second upper electrode portion
16B: Second upper electrode portion
16C: Second upper electrode portion
17: Third upper electrode portion
17A: Third upper electrode portion
17B: Third upper electrode portion
17C: Third upper electrode portion
18: First conduction portion
18A: First conduction portion
18B: First conduction portion
18C: First conduction portion
19: Third lower electrode portion
19A: Third lower electrode portion
19B: Third lower electrode portion
19C: Third lower electrode portion
20: First support
21: Second support
22: Third support
23: Insulating member
24: First lower electrode portion
25: Second lower electrode portion
26: Fourth upper electrode portion
27: Fourth lower electrode portion
28: Second conduction portion
29: Third conduction portion
30: Fourth conduction portion
31: Solder portion
32: Solder portion
33: Solder portion
34: Solder portion
40: Protection element
41: Heater
42: Insulating layer
50: Protection element
51: First conduction portion
51a: First through hole
51b: Second through hole

What is claimed is:

1. A protection circuit comprising:
    a plurality of protection elements connected in parallel,
    wherein each protection element configuring the plurality of protection elements has a first fuse element and a second fuse element connected in series,
    a heater connected between the first fuse element and the second fuse element,
    a first electrode part connected to a first end portion of the first fuse element on a side opposite to the second fuse element,
    a second electrode part connected to a first end portion of the second fuse element on a side opposite to the first fuse element,
    a third electrode part connected to both of a second end portion of the first fuse element and a second end portion of the second fuse element and connected to the heater in series,
    a conduction part directly connected to the third electrode part and having a lower resistance value than the heater, and
    a fourth electrode part directly connected to the conduction part and provided to be connectable to an external protection circuit,
    wherein the plurality of protection elements are connected in parallel,
    the protection circuit includes a bypass circuit connecting a plurality of the fourth electrode parts provided in the plurality of protection elements,
    the first fuse element and the second fuse element are integrally formed,
    the second end portion of the first fuse element and the second end portion of the second fuse element are directly connected,
    the third electrode part and the fourth electrode part are connected through the heater, and
    the conduction part is formed along at least one through hole penetrating a substrate in a thickness direction.

2. The protection circuit according to claim 1,
    wherein a melting point of the conduction part is higher than a melting point of any of the first fuse element and the second fuse element.

3. The protection circuit according to claim 1,
    wherein the conduction part is made of silver (Ag).

4. The protection circuit according to claim 1,
wherein the first fuse element and the second fuse element are disposed on one main surface side of the substrate, and the heater is disposed on the other main surface side of the substrate.

5. The protection circuit according to claim 1,
wherein the first fuse element and the second fuse element are disposed on one main surface side of the substrate, and the heater is disposed between the one main surface of the substrate and the first fuse element and the second fuse element.

6. The protection circuit according to claim 1,
wherein the conduction part is formed along a plurality of through holes penetrating the substrate in the thickness direction.

\* \* \* \* \*